April 11, 1961 M. R. KARGE ET AL 2,979,096
POCKETS FOR BEAN SNIPPER
Filed April 7, 1958 2 Sheets-Sheet 1

INVENTORS
Max R. Karge
Wyman I. Carlson
by Popp and Sommer
Attorneys.

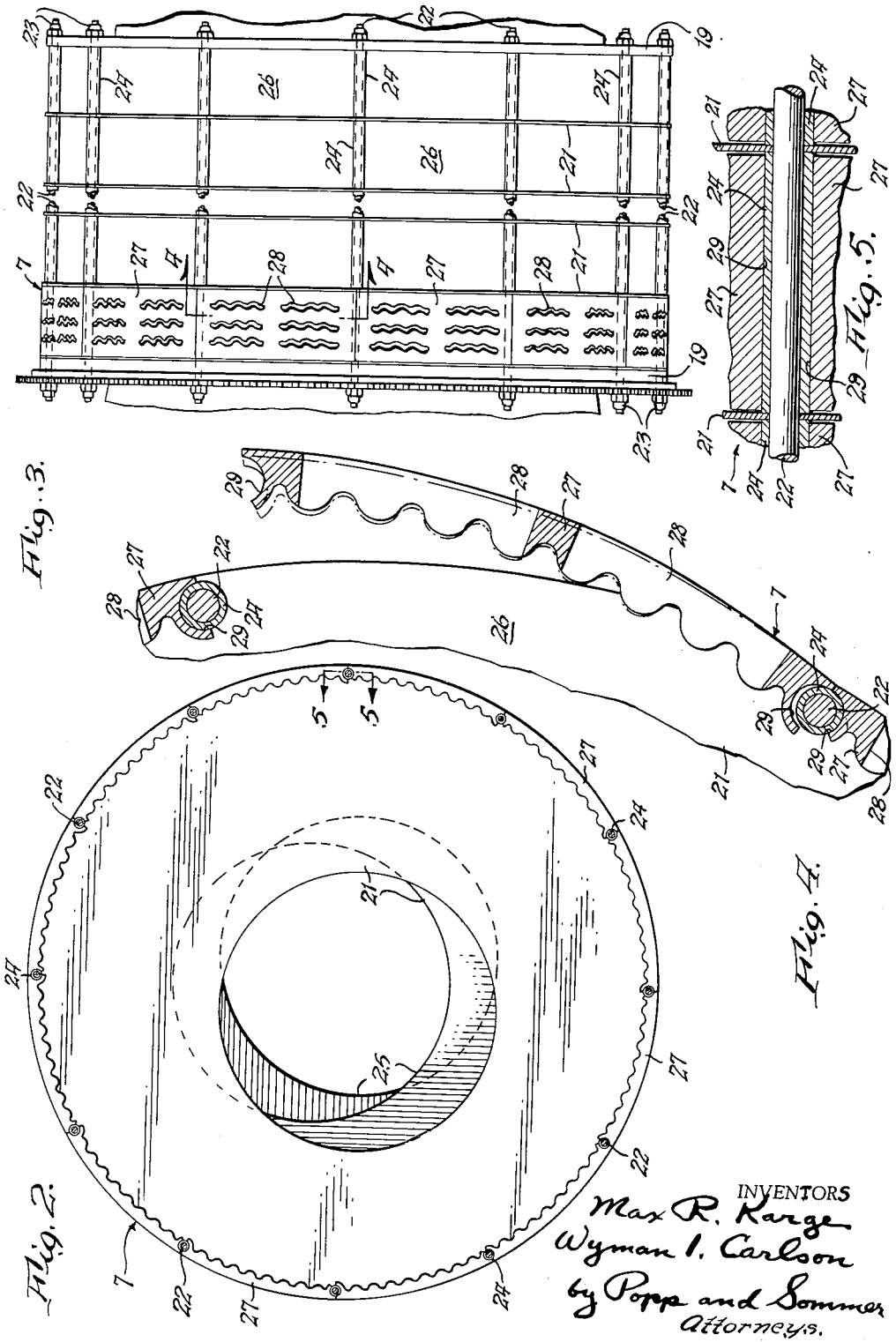

United States Patent Office 2,979,096
Patented Apr. 11, 1961

2,979,096

POCKETS FOR BEAN SNIPPER

Max R. Karge, Sanborn, and Wyman I. Carlson, Lewiston, N.Y., assignors to Chisholm-Ryder Company, Inc., Niagara Falls, N.Y., a corporation of New York Filed Apr. 7, 1958, Ser. No. 726,730

3 Claims. (Cl. 146—86)

This invention relates to food processing machinery and more particularly to an improvement in a bean snipper.

The patent to J. R. Urschel, 2,114,730, dated April 19, 1938, discloses a string bean snipper comprising an inclined cylindrical drum assembly including a plurality of pockets or segments each having perforations in the form of curved slots, and a plurality of knife blades resiliently arranged for sliding contact against the outside of the drum. As the drum is rotated, the ends of the beans therein will fall or extend through the slots and be cut off by the knife blades.

The present invention represents an improvement in the bean snipper disclosed in said patent, the principal improvement being in the manner of making and maintaining the drum assembly which reduces manufacturing and maintenance cost. More specifically, the drum segments in the bean snipper of the present invention are made from an elastic material which permits a temporary deformation of each segment so that it may be easily applied or removed from the drum assembly. In such manner, the fabrication of the drum assembly is rendered extremely simple, and the maintenance thereof is very economical since any single drum segment may be quickly removed and replaced without disassembly of the drum or associated parts.

The main object of this invention is to provide a bean snipper with an improved drum assembly.

A more specific object is to provide a bean snipper with an improved drum assembly which is extremely simple to fabricate and maintain in good working order.

A further object is to provide a bean snipper with an improved drum assembly which is of lower cost both from the standpoint of initial cost and maintenance cost.

Another object is to provide a bean snipper having a drum assembly with drum assembly segments, or pockets, which may be individually applied or removed from the drum assembly without disassembly of the drum or associated parts.

A further object of this invention is to provide a drum segment for a bean snipper which segment is formed from an elastic material.

Other objects and features of the invention will become more apparent from the following description and accompanying drawings wherein:

Fig. 2 is an enlarged section view generally as seen along line 2—2 in Fig. 1;

Fig. 3 is an enlarged fragmentary view of a drum assembly used in the machine of Fig. 1;

Fig. 4 is an enlarged section view generally as seen along line 4—4 in Fig. 3, and showing a drum segment in partially assembled condition; and Fig. 5 is an enlarged fragmentary section view generally as seen along line 5—5 in Fig. 2.

Figure 1:
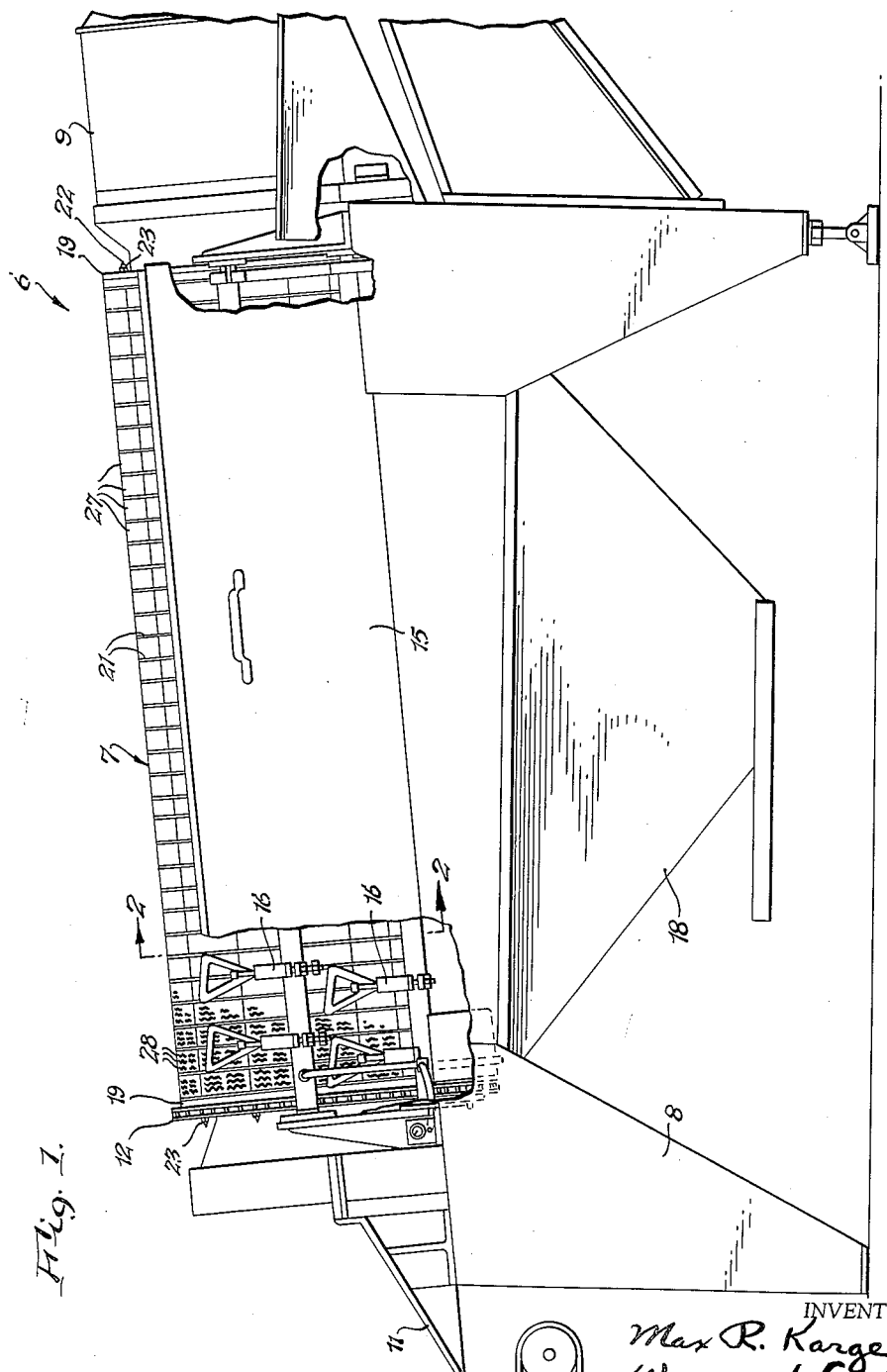
Fig. 1 is a side elevation view of a bean snipper incorporating the principles of the invention.

Referring now to the drawings, the numeral 6 identifies a bean snipper representative of an embodiment of the invention and which includes, a cylindrical drum assembly 7 rotatably supported at an angle to the horizontal upon a stand 8, a bean feed-in housing 9 at one end, a bean feed-out trough or chute 11 at the other end arranged to dispose the snipped means upon a conveyor belt 10, and a motor driven chain drive 12 arranged for rotation of the drum 7. Shields 15, coextensive with the drum 7, may be arranged along each side thereof. A plurality of knife blade assemblies 16 are maintained in sliding contact with the outer surface of the drum 7, and are adapted to shear or cut off the ends of the beans which project from the drum, which ends fall into a hopper 18 held by the stand 8, while the cut beans pass out of the drum by way of the feed-out trough 11. The structure and arrangement of the knife blade assemblies 16 represent an improvement in a bean snipper which is the subject of a copending patent application Serial No. 721,271, filed March 13, 1958, and which has an assignee in common with this application.

The drum assembly 7 includes a pair of disc-like end plates 19, a plurality of disc-like baffle plates 21, a plurality of rods 22 extending between the end plates 19 and having a nut 23 on each end, and a plurality of spacer sleeves 24 each of which is arranged upon a rod 22 between an end plate 19 and a baffle plate 21, or between adjacent baffle plates, as best seen in Fig. 3. Center holes 25 of the baffle plates 21, are arranged in staggered or eccentric relationship to assure proper tumbling action of the beans being processed. The resulting structure forms a cylindrical frame having openings 26 of uniform dimension, each of which is adapted to snugly receive a drum segment or pocket 27 formed of a plastic material, preferably a high impact polystyrene.

Each segment 27, has a plurality of elongated openings 28 of wavy or substantially zig-zag outline, and of uniform width or cross section, said openings being arranged in two groups of three openings in each group. Each segment 27 has an arcuate profile, i.e., is curved to conform to the peripheral outline of the end plates 19 and baffle plates 21, and has at each end a transverse semi-circular slot 29, of substantially the same radius as that of the spacer sleeves 24. The segment 27 is held in position within an opening 26, by engagement of the end slots 29 with adjacent spacer sleeves 24. To insert the segment 27 into such position, it is only necessary to place one end slot 29 into engagement with a spacer sleeve 24, and bend the segment until the other end slot 29 can be snapped into engagement with the other spacer sleeve. Such bending will temporarily reduce the dimension between the end slots 29 so that it is less than the minimum distance between adjacent spacer sleeves 24, whereby the segment can be snapped into position. To remove a segment 27 from an opening 26, it is only necessary to insert a hook in one of the slots 28, and pull outwardly after the hook is engaged. The inherent resiliency of the plastic material from which the segment is fabricated, allows a certain amount of bending without rupture, thus making possible the easy insertion or removal of a segment 27 from an opening 26. While plastic material is specified as the preferred material for fabrication of the segments 27, other materials having in general the same strength and elastic characteristics, may be used. Actually, the invention is primarily concerned with the manner of inserting or removing individual segments 27 from the drum assembly without removal of other parts of the drum assembly. Heretofore, such operations required removal of tie rods, or other time consuming procedures when one or more of the segments were to be inserted or removed.

The foregoing description has been given in detail without thought of limitation since the inventive principles involved are capable of assuming other physical embodiments without departing from the spirit of the invention and the scope of the appended claims.

What is claimed is:

1. A bean snipper comprising a rotatable drum comprising a pair of end plates having centrally alined journals, at least one intermediate baffle plate having a centrally disposed opening, uniformly spaced rods interconnecting peripheral portions of all of said plates, tubular spacers on said rods engaging opposed portions of said plates, and segments having elongated openings therethrough, each segment frictionally and removably engaging a pair of adjacent spacers and substantially filling the space between a pair of said spaced plates.

2. A bean snipper as set forth in claim 1 wherein each of said segments is distortable circumferentially for engagement with and disengagement from said spacers to permit individual insertion and removal from said spaces.

3. A bean snipper as set forth in claim 2 wherein each of said segments is made of a high impact polystyrene.

References Cited in the file of this patent

UNITED STATES PATENTS 2,114,730    Urschel _____ Apr. 19, 1938

FOREIGN PATENTS 164,916    Austria _____ Dec. 27, 1949